United States Patent
Kunigita et al.

(10) Patent No.: US 10,599,304 B2
(45) Date of Patent: Mar. 24, 2020

(54) CONTENT PLAYER

(75) Inventors: Hisayuki Kunigita, Kanagawa (JP); Seung-Hyun Lee, Seoul (KR); Jae-Hyun Park, Seoul (KR); Ju-Yeong Ji, Seoul (KR)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 1163 days.

(21) Appl. No.: 14/117,891

(22) PCT Filed: Apr. 10, 2012

(86) PCT No.: PCT/JP2012/059820
§ 371 (c)(1),
(2), (4) Date: Feb. 27, 2014

(87) PCT Pub. No.: WO2012/160895
PCT Pub. Date: Nov. 29, 2012

(65) Prior Publication Data
US 2014/0201632 A1    Jul. 17, 2014

(30) Foreign Application Priority Data
May 25, 2011  (JP) .................. 2011-117311

(51) Int. Cl.
G06F 3/0484    (2013.01)
H04N 21/466    (2011.01)
H04N 21/4788   (2011.01)

(52) U.S. Cl.
CPC ..... G06F 3/04842 (2013.01); H04N 21/4667 (2013.01); H04N 21/4788 (2013.01)

(58) Field of Classification Search
CPC .................................................. G06F 3/04842
See application file for complete search history.

(56) References Cited

U.S. PATENT DOCUMENTS 6,992,687 B1 * 1/2006 Baird .................. G06F 16/9558
                                                    715/805
2005/0144499 A1    6/2005 Narahara et al.
(Continued)

FOREIGN PATENT DOCUMENTS

JP    2005-167628 A    6/2005
JP    2009-38547 A     2/2009
(Continued)

OTHER PUBLICATIONS

Translation of International Preliminary Report on Patentability dated Nov. 26, 2013 from corresponding Application No. PCT/JP2012/059820.
(Continued)

*Primary Examiner* — Abdullah Al Kawsar
*Assistant Examiner* — David V Luu
(74) *Attorney, Agent, or Firm* — Katten Muchin Rosenman LLP

(57) ABSTRACT

The present invention provides a content player allowing a user to select content to view using a viewing history of content viewed by another user. The content player performs a content playing process in response to a user instruction. The content player acquires viewing history information about content viewed by a related user related to the user with a content player different from the content player. The content player presents, to the user, the acquired viewing history information. The content player performs, if the user selects the presented viewing history information, a playing process of content indicated by the selected viewing history information.

4 Claims, 7 Drawing Sheets

(56) References Cited

U.S. PATENT DOCUMENTS

| | | | |
|---|---|---|---|
| 2005/0166258 A1* | 7/2005 | Vasilevsky | G11B 27/00 |
| | | | 725/138 |
| 2006/0168529 A1* | 7/2006 | Rokosz | G06Q 10/10 |
| | | | 715/751 |
| 2008/0118232 A1 | 5/2008 | Kakuma et al. | |
| 2008/0168073 A1* | 7/2008 | Siegel | G06F 17/3002 |
| 2008/0313541 A1* | 12/2008 | Shafton | G06F 16/78 |
| | | | 715/725 |
| 2009/0133071 A1* | 5/2009 | Sakai | H04N 5/4403 |
| | | | 725/46 |
| 2009/0300520 A1* | 12/2009 | Ashutosh | H04L 12/1831 |
| | | | 715/756 |
| 2010/0306671 A1* | 12/2010 | Mattingly | G06Q 10/10 |
| | | | 715/753 |
| 2012/0174162 A1* | 7/2012 | Roberts | H04N 5/44543 |
| | | | 725/52 |

FOREIGN PATENT DOCUMENTS

| | | |
|---|---|---|
| JP | 2010-258986 A | 11/2010 |
| WO | 2011-102508 A1 | 8/2011 |

OTHER PUBLICATIONS

International Search Report dated May 22, 2012 from the corresponding PCT/JP2012/059820.

\* cited by examiner

FIG.8

SELECT A FRIEND WITH WHOM
TO VIEW CONTENT.

☑ USER Ub
☐ USER Uc
☐ USER Ud

CONTENT PLAYER

TECHNICAL FIELD

The present invention relates to a content player for a user to view a variety of content, a content viewing management system, content player control method and information storage medium.

BACKGROUND ART

A variety of content players are known for a user to view content such as movie images, music, still images, electronic books and games (refer, for example, to Patent Literature 1). Using such a content player allows the user to view content delivered from servers and the like. Further, by recording history information of content viewed by the user in the system, the user can select a desired piece of content to view from among pieces of content indicated by the history information. This allows the user to view content from where it was interrupted or view content that was viewed before.

CITATION LIST

Patent Literature

[PTL 1]
U.S. Patent Application Publication No. 2008/118232 Specification

SUMMARY

Technical Problem

In a conventional system such as that described above, if another user such as a friend of the user views content, it has been difficult to know what kind of content the other user viewed.

The present invention has been devised in light of the foregoing, and it is an object of the present invention to provide a content player that allows a user to select a piece of content to view by using content viewing history of another user, a content viewing management system including the content player, a content player control method, and an information storage medium.

Solution to Problem

A content player according to the present invention performs a content playing process in response to an instruction by a user. The content player includes viewing history information acquisition means, viewing history information presentation means and content playing means. The viewing history information acquisition means acquires viewing history information about content viewed by a related user related to the user with a content player different from the content player. The viewing history information presentation means presents, to the user, the viewing history information about content viewed by the related user acquired by the viewing history information acquisition means. The content playing means performs, if the user selects the viewing history information presented by the viewing history information presentation means, a playing process of content indicated by the selected viewing history information.

In the content player, the viewing history information may include interruption state information indicating the content playing state at the time of interruption if the playing of content by the different content player is interrupted, and the content playing means may start the playing of the content from the state determined in accordance with the interruption state information included in the selected viewing history information.

Further, in the content player, the viewing history information includes information about a joint viewing user who viewed content played by the different content player together with the related user, and the viewing history information presentation means presents, to the user, information included in the viewing history information and indicating the joint viewing user who viewed the content together with the related user.

Still further, in the content player, the viewing history information may further include viewing type information indicating in which mode the joint viewing user viewed the content together with the related user, and the viewing history information presentation means may present, to the user, in which mode the joint viewing user viewed the content together with the related user, in accordance with the viewing type information.

Still further, a content viewing management system according to the present invention includes a plurality of content players and a viewing history management server connected to each of the plurality of content players. Each of the plurality of content players includes content playing process means, viewing history information transmission means, viewing history information presentation means and content playing means. The content playing process means performs a content playing process in response to an instruction by a user. The viewing history information transmission means transmits viewing history information indicating the result of the content playing process to the viewing history management server. The viewing history information presentation means receives the viewing history information from the viewing history management server, presenting this information to the user. The content playing means performs, if the user selects the viewing history information presented by the viewing history information presentation means, a playing process of content indicated by the selected viewing history information. The viewing history management server includes means of recording a plurality of pieces of viewing history information received from the plurality of content players. The viewing history management server further includes means of transmitting, in response to a request from one of the plurality of content players, viewing history information about content viewed by a related user related to a user currently using the content player that made the request with a content player different from the content player that made the request, to the content player that made the request. The viewing history information presentation means of the content player that made the request presents the viewing history information about content viewed by the related user received from the viewing history management server to the user currently using the content player that made the request.

Still further, a control method of a content player according to the present invention is a control method of a content player adapted to perform a content playing process in response to an instruction by a user. The control method includes a viewing history information acquisition step of acquiring viewing history information about content viewed by a related user related to the user with a content player different from the content player. The control method includes a viewing history information presentation step of presenting, to the user, the viewing history information about content viewed by the related user acquired by the viewing history information acquisition step. The control method includes a content playing step of performing, if the user selects the viewing history information presented by the viewing history information presentation step, a playing process of content indicated by the selected viewing history information.

Still further, an information storage medium according to the present invention is a computer-readable information storage medium that stores a program adapted to control a content player configured to perform a content playing process in response to an instruction by a user. The program causes the content player to perform a process of acquiring viewing history information about content viewed by a related user related to the user with a content player different from the content player. The program causes the content player to perform a process of presenting, to the user, the acquired viewing history information about content viewed by the related user. The program causes the content player to perform a process of playing, if the user selects the presented viewing history information, content indicated by the selected viewing history information.

BRIEF DESCRIPTION OF DRAWINGS

FIG. 8 is a diagram illustrating an example of a joint viewing user inquiry screen.

DESCRIPTION OF EMBODIMENTS

A detailed description will be given below of an embodiment of the present invention based on the accompanying drawings.

Figure 1:
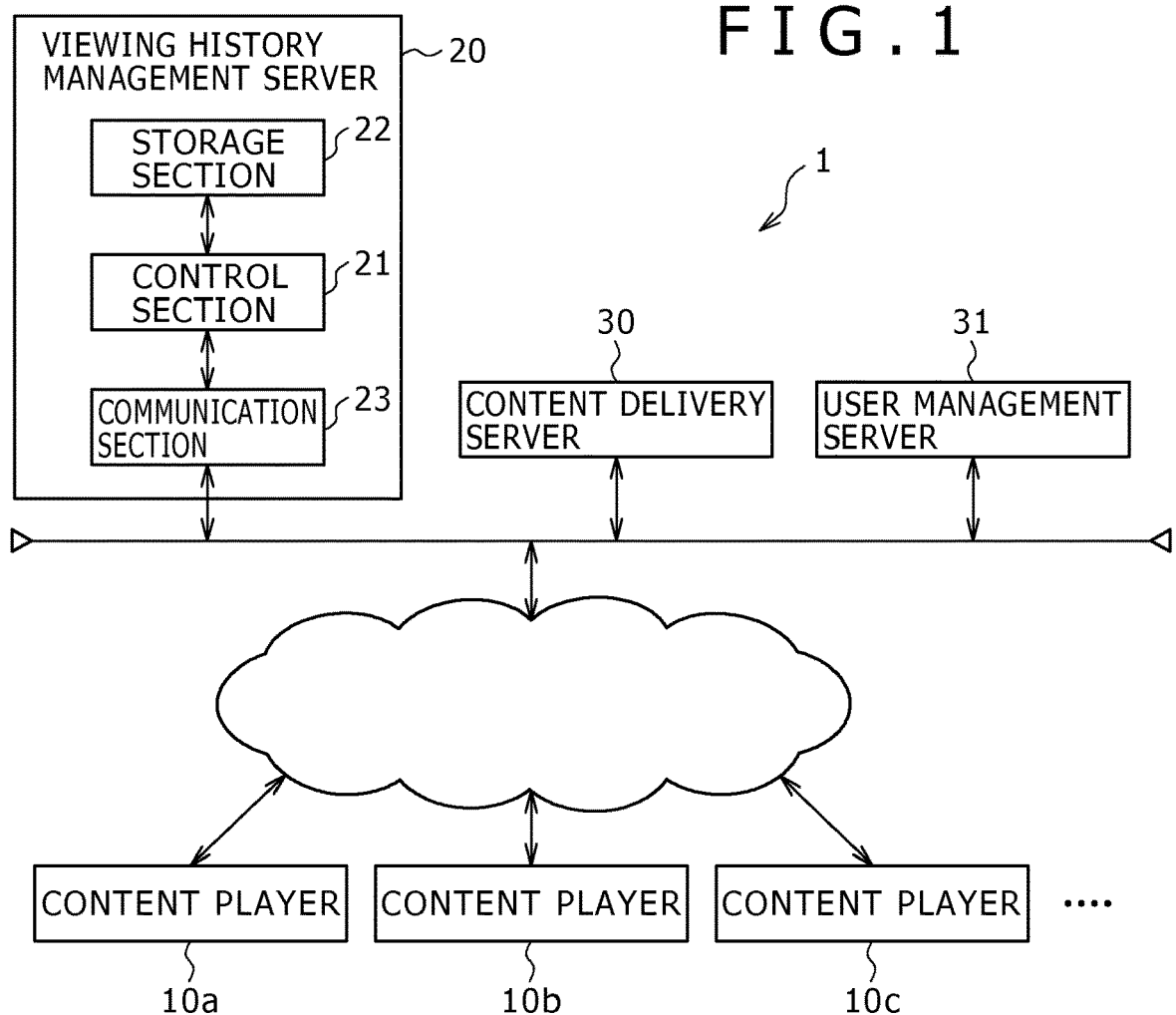
FIG. 1 is an outline diagram of a content viewing management system according to an embodiment of the present invention.

FIG. 1 is an outline diagram illustrating the general outline of a content viewing management system 1 according to an embodiment of the present invention. The content viewing management system 1 is configured by including a plurality of content players 10 and a viewing history management server 20. Further, in the present embodiment, the content viewing management system 1 further includes a content delivery server 30 and a user management server 31.

Each of the content players 10 is an information processor used by a user to view a variety of content, and the content players 10 may include a variety of stationary content players such as home gaming machine, desktop personal computer, video recorder and home television receiver. Alternatively, the content players 10 may include a variety of portable content players such as portable gaming machine, personal digital assistant, music player and electronic book reader. It should be noted that, in the present embodiment, a variety of content such as movie images, music, still images, electronic books and games may be played by the content players 10.

Figure 2:
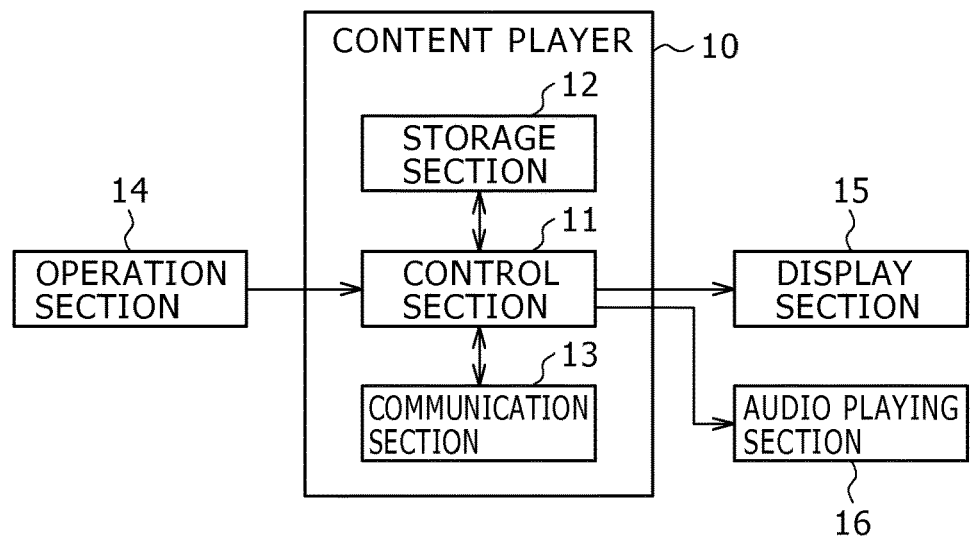
FIG. 2 is a configuration diagram of a content player according to the embodiment of the present invention.

FIG. 2 is a configuration block diagram illustrating the configuration of the content player 10. As illustrated in FIG. 2, the content player 10 includes a control section 11, storage section 12 and communication section 13. Further, the content player 10 is connected to an operation section 14, display section 15 and audio playing section 16.

The control section 11 is a program-controlled device such as CPU, performing a variety of information processing tasks in accordance with the program stored in the storage section 12. The storage section 12 is configured by including memory elements such as RAM and ROM, storing the program to be executed by the control section 11 and data to be processed by this program. In the present embodiment in particular, the storage section 12 stores data of content to be played by the content player 10. Further, the storage section 12 functions as a work memory of the control section 11.

The communication section 13 is an interface adapted to exchange data with other players via a communication network. The content player 10 exchanges information with the viewing history management server 20, content delivery server 30 and user management server 31 by way of the communication section 13. It should be noted that the content player 10 may be connected to the viewing history management server 20, content delivery server 30 and user management server 31 by way of a variety of communication networks such as the Internet, local area network and wireless communication network.

The operation section 14 is a device adapted to accept operation inputs from the user and may be, for example, a keyboard, mouse or remote controller. Further, the operation section 14 may include operation members such as operation buttons and switches provided on the surface of the enclosure of the content player 10. The user issues, to the content player 10, an instruction such as selecting a piece of content to play or starting or interrupting the playing of content by operating the operation section 14.

The display section 15 is an image display device such as liquid crystal display or organic EL display, displaying movie and still images, images included in content such as electronic books, and viewing history information to be selected by the user. The audio playing section 16 is a headphone, speaker or other device, playing audio data if the audio data is included in content played by the content player 10. It should be noted that the display section 15 and audio playing section 16 may be formed integrally with the enclosure of the content player 10 as with the operation section 14.

Content to be played by the content player 10 may include three types of content described below.

The first type of content is time-series data (stream data) that includes time-varying details such as movie images and audio data. This type of time-series data generally has a predetermined play time and is played sequentially from the start to end position with the passage of time.

The second type of content is spatial data representing the details having two- or three-dimensional spatial spread such as still images. The details of such spatial data are represented, for example, by pixel values of respective positions in a two-dimensional plane or the shapes and orientations of objects arranged at respective positions in a three-dimensional space. The content player 10 displays the details of such spatial data on a display device as images. In this case, the content player 10 may, in response to a user instruction, display only a specific range of the spatial data on which the user's attention is focused or display a specific area in an enlarged fashion.

The third type of content is permutation data that includes a plurality of pieces of content arranged in a predetermined order as components. For example, an electronic book is permutation data that includes, in a predetermined order, a plurality of pieces of page data (text or image data), each representing a page of a book. Content such as a series drama made up of movie images of a plurality of episodes is also a kind of permutation data. These pieces of permutation data are commonly played in a predetermined order. As a playing method of this type of content, when the playing of a piece of content making up permutation data ends, the playing of a next piece of content begins automatically in some cases. In other cases, the playing of a next piece of content begins when so instructed by the user.

It should be noted that content to be played by the content player 10 according to the present embodiment is not limited to the types described above. The content player 10 may play, for example, game content. Game content in this case is made up of video and audio that change, for example, with change in the nature of user operation input.

The viewing history management server 20 is an information processor such as server computer, managing the viewing history of content played by each of the content players 10. More specifically, the viewing history management server 20 stores the viewing history received from each of the content players 10, transmitting the details thereof to each of the content players 10 at predetermined timings. Transmission via the viewing history management server 20 allows the viewing histories to be shared among the plurality of content players 10 belonging to the content viewing management system 1 without being directly connected to each other for communication.

The viewing history management server 20 is configured by including a control section 21, storage section 22 and communication section 23 as illustrated in FIG. 1.

The control section 21 is a program-controlled device such as CPU, performing a variety of information processing tasks in accordance with the program stored in the storage section 22. The storage section 22 is configured by including memory elements such as RAM and ROM and disk devices such as hard disk, storing the program to be executed by the control section 21 and data to be processed by this program. In the present embodiment in particular, the storage section 22 stores content viewing history information to be managed. Further, the storage section 22 functions as a work memory of the control section 21.

The communication section 23 is an interface adapted to exchange data with other players via a communication network. The viewing history management server 20 exchanges information with each of the content players 10 by way of the communication section 23.

The content delivery server 30 is an information processor such as server computer, storing content to be played by each of the content players 10 and delivering content in response to a request from each of the content players 10. The content delivery server 30 may deliver streams of video data or the like representing the execution result of time-series data or a game to each of the content players 10 (real-time delivery). Alternatively, the content delivery server 30 may cause the content players 10 to download a variety of content including time-series data. In the present embodiment in particular, it is assumed that the content delivery server 30 has a broadcasting function to simultaneously deliver, in response to a request, the same content to the plurality of content players 10 in real time. It should be noted that although the content delivery server 30 delivers content in the present embodiment, the present invention is not limited thereto. Instead, content may be delivered from one of the content players 10 to another content player 10, for example, through peer-to-peer connection.

The user management server 31 is an information processor such as server computer, managing a plurality of users viewing content using the content viewing management system 1 according to the present embodiment. More specifically, the user management server 31 manages user identification information used to identify each user, verification target information used to authenticate each user and other information as a user database, authenticating users in response to a request from the content player 10.

Figure 3:
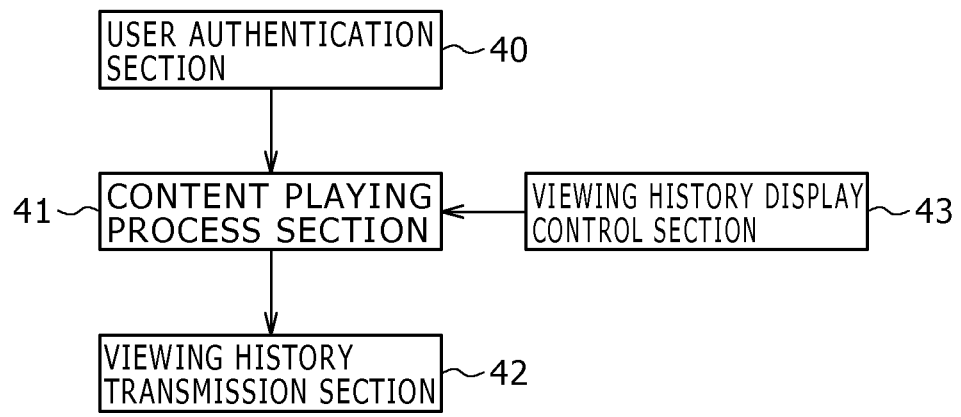
FIG. 3 is a functional block diagram illustrating functions of the content player according to the embodiment of the present invention.

A description will be given below of the functions achieved by the content player 10 in the present embodiment. FIG. 3 is a functional block diagram illustrating the functions achieved by the content player 10. As illustrated in FIG. 3, the content player 10 is configured by including a user authentication section 40, content playing process section 41, viewing history transmission section 42 and viewing history display control section 43. These functions are achieved by the control section 11 executing the program stored in the storage section 12. This program may be supplied stored on one of a variety of computer-readable information storage media such as optical disk. Alternatively, the program may be supplied via a communication network such as the Internet.

The user authentication section 40 performs an authentication process (login process) of the user using the content player 10 ahead of the content playing process performed by the content playing process section 41 which will be described later. For example, the user authentication section 40 accepts an input of authentication information used to authenticate the user from the user of the content player 10 when the content player 10 is started. Authentication information entered by the user may be, for example, a password or biological authentication information (e.g., fingerprint information). The user authentication section 40 transmits the entered user authentication information to the user management server 31. The user management server 31 compares the authentication information transmitted from the content player 10 against the verification target information of the user stored in the user database, transmitting the verification result to the content player 10. This allows the content player 10 to authenticate the user attempting to view content using the content player 10. It should be noted that a user who has been authenticated by the user authentication section 40 will be referred to as an authenticated user in the description given below. Once the authentication by the user authentication section 40 is complete, it is assumed that the authenticated user uses the content player 10 until the authenticated user explicitly issues an instruction to terminate the use of the content player 10 (log out from the content player 10) or until the power for the content player 10 is turned off.

The content playing process section 41 performs a content playing process in response to a user instruction made on the operation section 14. As described earlier, it is assumed that when the content playing process section 41 performs a content playing process, the user issuing an instruction to perform the content playing process has been authenticated by the user authentication section 40. This makes it possible for the content playing process section 41 to identify who the user issuing the instruction to perform the content playing process is. It should be noted that if the user has yet to be authenticated when the content playing process section 41 accepts an instruction to perform the content playing process from the user, the user authentication section 40 may authenticate, at this point in time, the user who issued the instruction.

A description will be given here of the details of the process performed by the content playing process section 41. First, the content playing process section 41 accepts a selection of content to be played from the authenticated user. As an example, the content playing process section 41 presents, to the authenticated user, pieces of content downloaded from the content delivery server 30 and stored in the content player 10 in advance, those that can be delivered by the content delivery server 30 and so on as options of content to be played. Then, the content playing process section 41 accepts an operation made on the operation section 14 to select a piece of content from the authenticated user. Alternatively, the content playing process section 41 may select, with a plurality of pieces of viewing history information displayed on the display section 15 by the viewing history display control section 43, a piece of content corresponding to the viewing history information selected by the authenticated user as a piece of content to be played. A specific example of this case will be described later.

Further, the content playing process section 41 starts the playing process of the selected piece of content when accepting an instruction to start the content playing process from the authenticated user. It should be noted that the content playing process section 41 may start the content playing process immediately when accepting the above operation to select a piece of content. More specifically, if the piece of content to be played includes images and video data, the content playing process section 41 causes the display section 15 to display the images and video data. On the other hand, if the piece of content to be played includes audio data, the content playing process section 41 causes the audio playing section 16 to play the audio. This allows the authenticated user to view the selected piece of content. Further, if the authenticated user issues an instruction from the operation section 14 to interrupt the playing of the piece of content halfway, the content playing process section 41 interrupts the playing. At this time, the content playing process section 41 outputs information indicating the content playing state at the time of interruption of the playing process of the piece of content (hereinafter referred to as interruption state information RI) to the viewing history transmission section 42.

The viewing history transmission section 42 transmits, following the content playing process performed by the content playing process section 41, viewing history information VH reflecting the result of the process to the viewing history management server 20. The viewing history management server 20 stores, in the storage section 22, the viewing history information VH received from each of the plurality of content players 10 for management.

Figure 4:
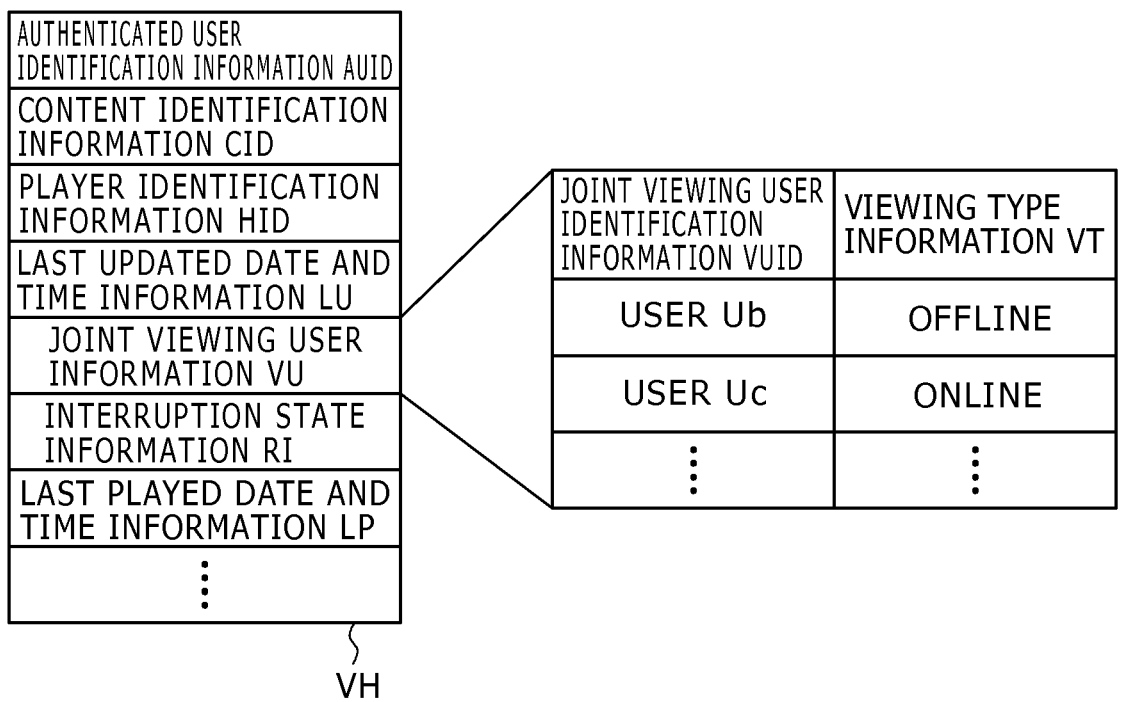
FIG. 4 is a diagram schematically illustrating details of viewing history information.

A description will be given here of the details of the viewing history information VH of content managed by the viewing history management server 20. FIG. 4 is a diagram schematically illustrating the details of the viewing history information VH. As illustrated in FIG. 4, the viewing history information VH of content includes authenticated user identification information AUID, content identification information CID, player identification information HID and last updated date and time information LU. The authenticated user identification information AUID identifies the authenticated user who viewed the piece of content. The content identification information CID identifies the piece of content. The player identification information HID identifies the content player 10 that played the piece of content. The last updated date and time information LU indicates when the viewing history information VH was last updated. Further, the viewing history information VH includes joint viewing user information VU about the user who viewed the piece of content together with the authenticated user identified by the authenticated user identification information AUID. Still further, the viewing history information VH includes the interruption state information RI described earlier. Still further, the viewing history information VH may include information indicating the user's viewing state of the piece of content up to now (e.g., the total number of times the piece of content was played, when it was viewed first, and when it was viewed last). It should be noted that information indicating when the piece of content was viewed last may indicate when the content playing process performed by the content playing process section 41 was terminated normally last. If the piece of content is time-series or permutation data, information indicating when the piece of content was viewed last may indicate when the user viewed the piece of content to the end (up to the end position of the time-series data or up to the last component included in the permutation data). In the description given below, information about the date and time when the content playing process was terminated last will be referred to as last played date and time information LP, irrespective of whether the piece of content as a whole was viewed to the end.

The player identification information HID is stored in advance in the storage section 12 of the content player 10 and uniquely identifies each of the content players 10. Further, the authenticated user identification information AUID identifies the authenticated user who issued an instruction to view the piece of content. In the present embodiment, user identification information is stored in advance in the user management server 31. This information identifies each user who is likely to view content using the content player 10. If the authentication is successful, the user authentication section 40 receives user identification information about the authenticated user who has been authenticated from the user management server 31, storing the user identification information in the storage section 12. This user identification information about the authenticated user is stored in the viewing history information VH as the authenticated user identification information AUID.

On the other hand, the content identification information CID identifies each piece of content viewed with the content viewing management system 1. For example, the content identification information CID is assigned to a piece of content by a content supplier or the content delivery server 30 and delivered from the content delivery server 30 together with the piece of content. It should be noted that the content identification information CID may be information such as hash value which is generated from the content data based on a predetermined algorithm (e.g., MD5). In this case, if the content players 10 and content delivery server 30 calculate hash values using the same algorithm, they can assign the same content identification information CID to the same piece of content independently of each other.

The interruption state information RI indicates, as described earlier, the content playing state at the time of interruption if the content playing process performed by the content playing process section 41 is interrupted. It should be noted that when a piece of content is played to the end without any interruption, the interruption state information RI may include information indicating the completion of playing of content to the end rather than information indicating the content playing state at the time of interruption.

More specifically, if the piece of content is time-series data such as movie images or audio, the interruption state information RI includes information indicating the timing itself when the playing of the piece of content was interrupted. For example, the interruption state information RI, time-series data, may indicate the playing time from the start position to the time of interruption. On the other hand, if the piece of content is a movie image made up of a plurality of frame images, the interruption state information RI may indicate the number (frame number) obtained by counting the frame images that have been displayed at the time of interruption from the first frame image. It should be noted that, depending on content, there may be a plurality of pieces of content data generated in a plurality of types of data formats for the same piece of content. For example, if the piece of content is a movie image, two data formats, one with high resolution and the other with low resolution (or three or more types with different resolutions from each other), may be available. In this case, it is likely that the playing time may be different from one data format to another even for the same piece of content due, for example, to the difference in option data (e.g., movie image representing a commercial message) added to each piece of data. In such a case, it is preferred that information indicating the details of the piece of content that was played up to the time of interruption without being dependent on the difference in data format should be used as the interruption state information RI. More specifically, it is only necessary to use information indicating the playing time of the piece of content itself excluding the option data added to each piece of data or information indicating the frame number of the piece of content itself as the interruption state information RI.

If the piece of content is spatial data such as still image, the interruption state information RI may include position coordinate information indicating at what position of the still image the image is displayed to be centered or the magnification ratio at which the still image is displayed at the time of interruption.

If the piece of content is permutation data such as electronic book, the interruption state information RI includes information indicating what number component of the plurality of components included in the permutation data was played. Further, the interruption state information RI may include information about the component being played at the time of interruption indicating the playing state at the time of interruption as with the time-series data and spatial data described above. As a specific example, if the piece of content is an electronic book, the interruption state information RI includes information indicating the section such as the chapter and paragraph viewed by the user at the time of interruption or information indicating the page number viewed. Further, the interruption state information RI may include position coordinate information and magnification ratio information indicating which area of the page image identified by these pieces of information has been enlarged at what magnification ratio. Still further, if the user views each page image while scrolling through the image or moving the cursor, the interruption state information RI may include information indicating how much the image was scrolled by the time of interruption, the cursor position and the row (i.e., information about down to what position of the page the user has viewed).

Further, if the piece of content is game content, the interruption state information RI may indicate the progress of a game generated by a game program serving as the content playing process section 41.

The joint viewing user information VU relates to the user who viewed the piece of content indicated by the viewing history information VH together with the authenticated user identified by the authenticated user identification information AUID (hereinafter referred to as the joint viewing user). The present embodiment assumes that the plurality of users view the same piece of content at the same time (together). Information about such joint viewing is included in the viewing history information VH as the joint viewing user information VU. This makes it possible for the viewing history information VH to indicate not only who viewed which piece of content and when the piece of content was viewed but also with whom the piece of content was viewed. More specifically, the content playing process section 41 acquires joint viewing user identification information VUID identifying the joint viewing user who views the piece of content together with the authenticated user when performing the content playing process. It should be noted that the specific method used to acquire the joint viewing user identification information VUID will be described later. Then, the viewing history transmission section 42 generates the viewing history information VH by including the joint viewing user identification information VUID in the joint viewing user information VU. It should be noted that, in the present embodiment, the joint viewing user is also a user managed by the user management server 31 (i.e., user whose unique user identification information is registered in the user management server 31). The joint viewing user identification information VUID is user identification information managed by the user management server 31 as with the authenticated user identification information AUID.

Further, the joint viewing user information VU may include information indicating, for each of the joint viewing users identified by the joint viewing user identification information VUID, in which mode the joint viewing user viewed the piece of content together with the authenticated user (hereinafter referred to as viewing type information VT). The present embodiment assumes that a joint viewing user views content together with the authenticated user in one of two modes. In the first mode, the joint viewing user visits, for example, his or her friend's house so that the authenticated user and joint viewing user view the content using the single content player 10 owned by the authenticated user at the same place together. In the description given below, joint viewing in this mode will be referred to as offline type joint viewing. In the second mode, on the other hand, the content delivery server 30 delivers content simultaneously in real time to each of the plurality of content players 10 as described above (here, the content player 10 owned by the authenticated user and the content player 10 owned by the joint viewing user) so that the authenticated user and joint viewing user view the content simultaneously with their own content players 10. In the description given below, joint viewing in this mode will be referred to as online type joint viewing. It should be noted that offline and online type joint viewing may be performed at the same time. As a specific example, a probable case is that users Ua and Ub view content C1 together using a content player 10*a* owned by the user Ua at the same place, whereas a user Uc views the same content C1 simultaneously at a remote location using a content player 10c owned by himself or herself. In this case, from the viewpoint of the user Ua, the user Ub views the content through offline type joint viewing, whereas the user Uc views the content through online type joint viewing. From the viewpoint of the user Uc, on the other hand, both the users Ua and Ub view the content through online type joint viewing with the user Uc himself or herself.

A description will be given next of the details of the process performed by the viewing history transmission section 42. In the present embodiment, when the content playing process is performed by the content playing process section 41, the viewing history transmission section 42 generates the viewing history information VH reflecting the result of the content playing process, transmitting the result to the viewing history management server 20. It should be noted that if an authenticated user views the same piece of content for the second time onwards, the viewing history information VH including the authenticated user identification information AUID of the authenticated user and the content identification information CID of the content should have already been generated and transmitted to the viewing history management server 20. Therefore, the viewing history transmission section 42 may, during playing of the content for the second time onwards, receive the viewing history information VH that was generated in the past as a result of the authenticated user viewing the content from the viewing history management server 20 and update the received viewing history information VH. In this case, the viewing history transmission section 42 overwrites the player identification information HID included in the viewing history information VH with its own player identification information HID and also overwrites the last updated date and time information LU with date and time information indicating the time of execution of the updating (i.e., time when the content playing process ended). Further, the viewing history transmission section 42 replaces the interruption state information RI with information indicating the playing state at the time of interruption of the current content playing process accepted from the content playing process section 41. Still further, the viewing history transmission section 42 may perform updating such as adding "1" to the number of times the piece of content was played in the past if such information is included in the viewing history information VH. It should be noted that although the last updated date and time information LU here indicates when the viewing history information VH was updated in the content player 10, the last updated date and time information LU may indicate when the viewing history information VH was updated in the viewing history management server 20. In this case, the content player 10 does not update the last updated date and time information LU. Instead, the viewing history management server 20 receives the viewing history information VH from the content player 10 and updates the last updated date and time information LU in the viewing history information VH with the date and time information at the time of updating when updating the viewing history information VH stored in itself with the received viewing history information VH.

The viewing history transmission section 42 may update the viewing history information VH of the piece of content immediately when the content playing process by the content playing process section 41 ends, automatically transmitting the viewing history information VH to the viewing history management server 20. Further, the viewing history transmission section 42 may access the viewing history management server 20 at constant time intervals, transmitting the viewing history information VH that has been updated to that point in time to the viewing history management server 20. Still further, the viewing history transmission section 42 may transmit the updated viewing history information VH to the viewing history management server 20 after having accepted an explicit instruction to transmit the viewing history information VH from the authenticated user.

Still further, in the present embodiment, if the content playing process section 41 plays a piece of content that was viewed in the past by the user, the content playing process section 41 may start the playing of the piece of content from the state determined in accordance with the interruption state information RI included in the viewing history information VH received from the viewing history management server 20. In this case, the content playing process section 41 refers to the interruption state information RI included in the viewing history information VH received from the viewing history management server 20 ahead of the content playing process, starting the content playing process from the state appropriate to that indicated by the interruption state information RI (i.e., playing state at the time of interruption of the previous playing of the content). It should be noted that the state from which the content playing process section 41 starts to play the content need not necessarily be the playing state at the time of interruption of the past content playing. For example, it may be the playing state at a timing earlier by a predetermined period of time (e.g., 30 seconds) than the point in time of interruption.

For example, if the piece of content to be played is time-series data, the content playing process section 41 starts to play the remainder of the content from the timing indicated by the interruption state information RI or from the timing earlier by the predetermined period of time than the timing indicated by the interruption state information RI. In particular, if content is played by receiving streams delivered from the content delivery server 30, the content playing process section 41 makes a request to the content delivery server 30 to deliver the remainder of the content from the timing determined in accordance with the interruption state information RI. This allows the user to continue to view the same piece of content if the viewing of a movie image or audio was previously interrupted halfway.

If the piece of content to be played is spatial data, the content playing process section 41 displays the content in the same image display mode (display position and magnification ratio) as that indicated by the interruption state information RI in which the user was viewing the content at the time of interruption. Further, if the piece of content to be played is permutation data made up of a plurality of components, the content playing process section 41 plays the component that was being played at the time of previous interruption in the same playing state as at the time of previous interruption.

Such a process allows the user to resume the viewing of content later from the state appropriate to that at the time of previous interruption if he or she interrupts the viewing of content halfway. Moreover, in the present embodiment, the interruption state information RI is related not only to the content identification information CID but also to the authenticated user identification information AUID, being transmitted to the viewing history management server 20 as part of the viewing history information VH. Then, this viewing history information VH is transmitted also to another content player 10 used by the same user from the viewing history management server 20. This allows the user, for example, to view the continuation of a piece of content with the different content player 10, a portable player, after having viewed the piece of content halfway with the stationary content player 10. Further, the viewing history information VH generated as a result of viewing with the portable content player 10 can also be transmitted to the stationary content player 10 by way of the viewing history management server 20. This allows the user to view, with the stationary content player 10 again, the continuation of content that was viewed with the portable content player 10.

The viewing history display control section 43 receives the plurality of pieces of viewing history information VH from the viewing history management server 20, presenting to the user by displaying lists of the received viewing history information VH on the display section 15. The present embodiment assumes that the viewing history display control section 43 displays two types of lists as lists of the viewing history information VH. The first list includes only a viewing history of content viewed by the authenticated user himself or herself. The second list includes a viewing history of content viewed by another user related to the authenticated user. It should be noted that, in the description given below, a user related to an authenticated user will be referred to as a related user. The second list may include not only the viewing history information VH of a related user but also that of an authenticated user himself or herself. The viewing history display control section 43 may switch between the first and second lists for display.

The present embodiment assumes that information about the relation between the users is stored in the user management server 31. That is, the user management server 31 stores information indicating which user is a related user of which user. Each user specifies his or her friend or acquaintance as a related user, for example, in the same manner as in well-known social network services. More specifically, if the user Ua wishes to specify the user Ub as a related user, the user Ua requests the user Ub for registration as a friend, for example, by transmitting a message to the user Ub. When the user Ub approves the request, a friendly relationship is established between the users Ua and Ub so that the user Ub becomes a related user of the user Ua, and that the user Ua becomes a related user of the user Ub. It should be noted that although a bidirectional relation is established between the users here, a unidirectional relation may be established therebetween. That is, in the example described above, it is also possible that the user Ub becomes a related user of the user Ua after the request by the user Ua and approval by the user Ub, but that the user Ua does not become a related user of the user Ub. It should be noted that not only the user management server 31 but also each of the content players 10 may hold in advance information identifying related users of the user using the content player 10.

In order to enable the display of the above second list, the viewing history management server 20 receives the viewing history information VH from each of the plurality of content players 10 connected to the viewing history management server 20 via a communication network, storing the information VH. Then, if a request is made from one of the content players 10, the viewing history management server 20 acquires information identifying the related user of the authenticated user who is using the content player 10, transmitting the viewing history information VH of the related user identified by the information to the content player 10. This allows the content player 10 to acquire not only the viewing history information VH generated by the authenticated user viewing the content himself or herself in the past but also the viewing history information VH generated as a result of the related user of the authenticated user viewing the content using another content player 10. It should be noted that the viewing history management server 20 may acquire information identifying the related user (user identification information of the related user) from the content player 10 itself requesting the transmission of the viewing history information VH. Alternatively, the viewing history management server 20 may identify the related user of the authenticated user who requested the transmission of the viewing history information VH by inquiring the user management server 31.

Figure 5:
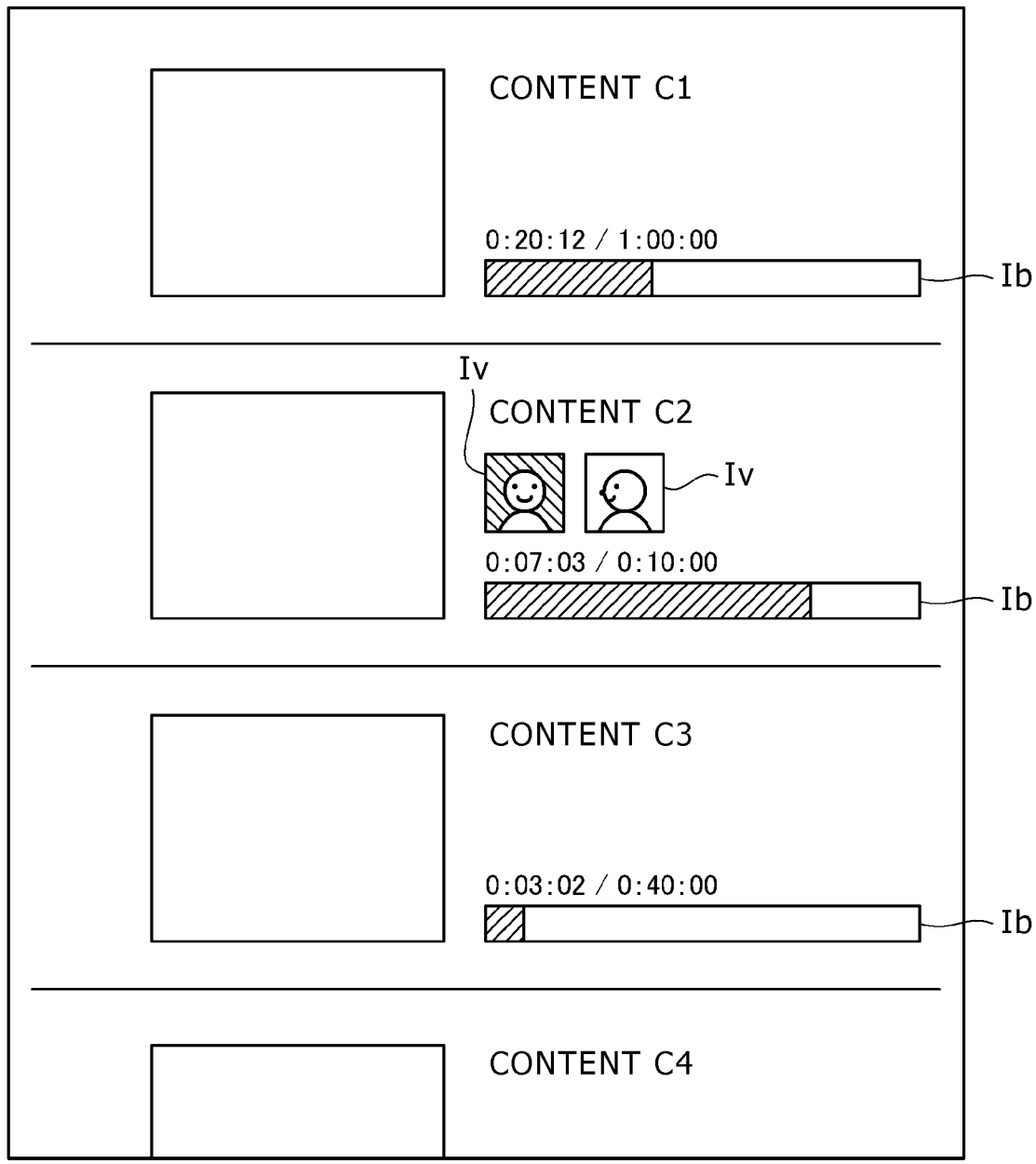
FIG. 5 is a diagram illustrating an example of a screen presenting a list of viewing history information to a user.

FIG. 5 is a diagram illustrating an example of a screen displaying a first list of a viewing history. This first list is made up of the viewing history information VH of the authenticated user himself or herself. Therefore, if the user instructs the display of the list, the viewing history transmission section 42 requests the viewing history management server 20 to transmit the viewing history information VH including the authenticated user identification information AUID that matches the user identification information of the authenticated user who instructed the display of the list. Then, the viewing history display control section 43 receives the viewing history information VH transmitted from the viewing history management server 20 in response to this request, displaying a list. It should be noted that if, in this case, the plurality of pieces of viewing history information VH, generated by the authenticated user viewing a piece of content a plurality of times, are recorded in the viewing history management server 20, the viewing history display control section 43 may include only the latest (one with the latest last updated date and time information LU) of all the pieces of viewing history information VH.

In the list shown in FIG. 5, the display item for each piece of the viewing history information VH includes a content title and thumbnail image indicating the details of the content. Further, the display item also includes information indicating the interruption state of content viewing identified by the interruption state information RI. FIG. 5 shows, as a display example in which the piece of content is time-series data, an image Ib in the form of a progress bar that appears at the time of generation of the viewing history information VH to indicate an approximate percentage of the entire playing time the elapsed time accounts for when the content viewing was interrupted. It should be noted that if the piece of content is permutation data made up of video data or image components, the above thumbnail image may be a frame image or component image indicating the details of the content at the time of previous interruption of the content viewing. Further, each display item may include, for example, date and time information about when the content was viewed (last played date and time information LP) and the name of the content player 10 that played the content (information appropriate to the player identification information HID).

Further, if the viewing history information VH includes the joint viewing user information VU, each of the display items in the list may include information indicating the joint viewing user who viewed the piece of content together with the authenticated user. In the example shown in FIG. 5, a joint viewing user symbol image Iv symbolizing a joint viewing user is displayed in a display item (second display item from top) of all the display items in the list which matches the viewing history information VH including the joint viewing user information VU. The joint viewing user symbol image Iv may be, for example, an icon image registered in the user management server 31 for each user or a character string image representing a user name. Further, the viewing history display control section 43 may display, in the list, a viewing type for each joint viewing user identified by viewing type information VT. For example, the viewing history display control section 43 displays in which mode each joint viewing user was engaged in joint viewing (i.e., online or offline type joint viewing) by changing the display mode for the joint viewing user symbol image Iv for each viewing type. In this case, the display mode may be changed, for example, by changing the color of the joint viewing user symbol image Iv or adding a given marking, different from one viewing type to another, to the joint viewing user symbol image Iv. The example in FIG. 5 shows that two joint viewing users were engaged in joint viewing together with the authenticated user in different modes by using different background colors for the icon images serving as the joint viewing user symbol images lv.

It should be noted that the viewing history display control section 43 may selectively display, in response to a user instruction, a list of only the viewing history information VH including user identification information of specific related users specified by the user as the joint viewing user identification information VUID of all the viewing history information VH included in the above first list. In the present embodiment, the joint viewing user information VU is included in the viewing history information VH. Therefore, even if the authenticated user views the same piece of content a plurality of times, the pieces of viewing history information VH different from each other are recorded, with each piece of the viewing history information VH including the joint viewing user information VU that indicates, for each of the plurality of viewing occasions, with whom the piece of content was viewed. Therefore, the viewing history display control section 43 can generate and display a viewing history list for each joint viewing user by extracting, as a key, the joint viewing user identification information VUID specified by the user from the plurality of pieces of viewing history information VH including the authenticated user identification information AUID that matches the user identification information of the authenticated user. This makes it possible for the authenticated user to browse a list including, of all the pieces of content he or she viewed, only those he or she viewed together with a specific related user. It should be noted that the authenticated user may specify not only the joint viewing user identification information VUID but also the viewing type information VT so that the viewing history display control section 43 extracts the viewing history information VH including the specified joint viewing user identification information VUID and viewing type information VT and displays a list thereof. This allows the authenticated user to browse a list including only those pieces of content he or she viewed together with a specific user in a specific mode.

Figure 6:
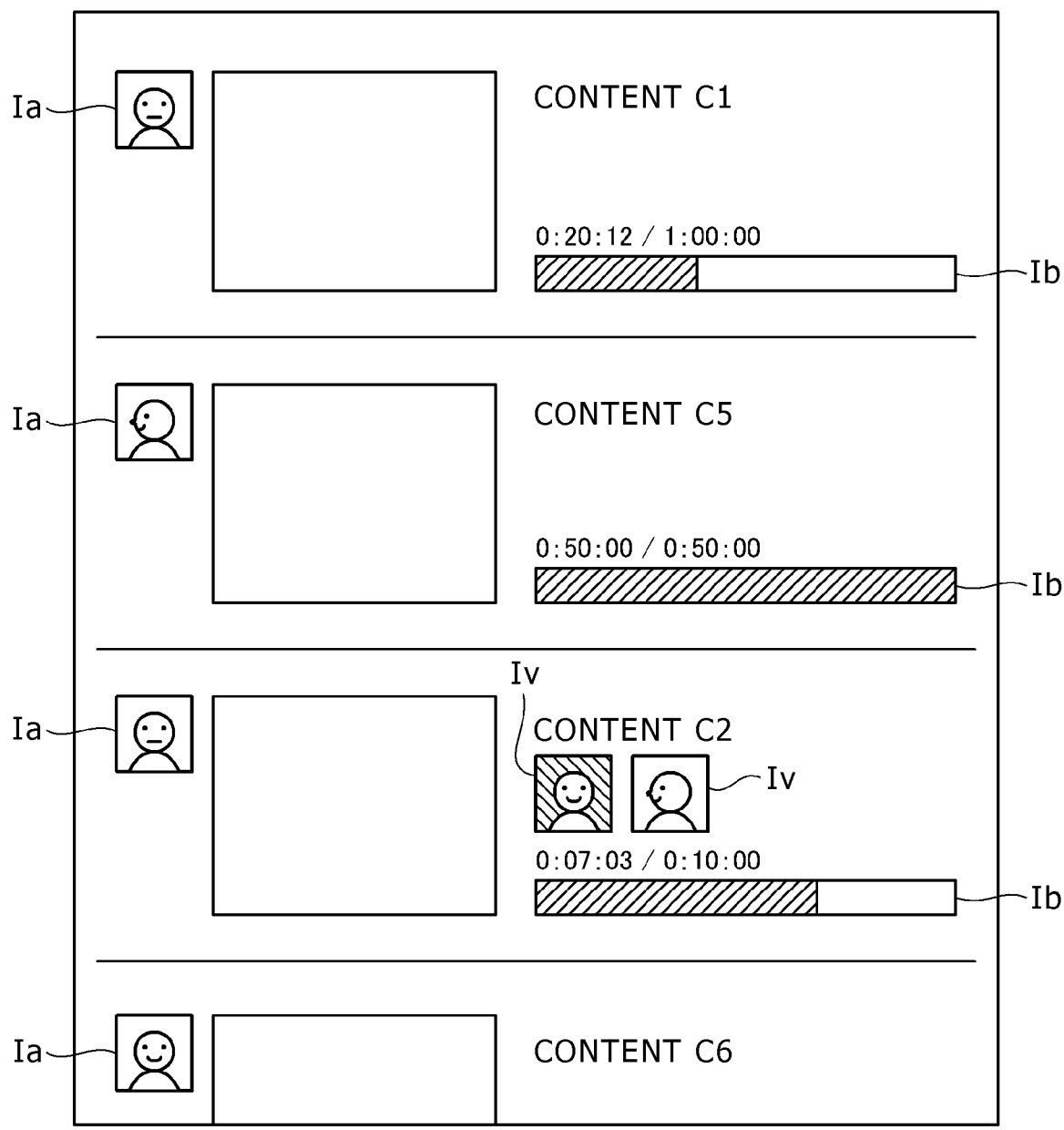
FIG. 6 is a diagram illustrating another example of a screen presenting a list of viewing history information to a user.

FIG. 6 is a diagram illustrating an example of a screen displaying a second list of a viewing history. In this example, it is assumed that the second list is a list of the viewing history information VH for both the authenticated and related users. As illustrated in FIG. 6, each display item in the second list includes, in addition to the details displayed in the first list shown in FIG. 5, an authenticated user symbol image Ia symbolizing the authenticated user identified by the authenticated user identification information AUID of the viewing history information VH. The authenticated user symbol image Ia may be an icon image specified for each user or a character string image representing a user name as with the joint viewing user symbol image Iv.

In the state in which a list of the viewing history information VH is displayed by the viewing history display control section 43, if the user selects a piece of the viewing history information VH included in the list by making an instruction operation on the operation section 14, the content playing process section 41 performs a playing process of a piece of content appropriate to the selected piece of viewing history information VH (i.e., piece of content identified by the content identification information CID in the viewing history information VH). Further, in this case, the content playing process section 41 may start the content playing process from the state appropriate to the interruption state indicated by the interruption state information RI in the selected piece of viewing history information VH. This makes it possible for the authenticated user to select a piece of content that the authenticated user viewed in the past and view the continuation of the content from where the viewing was previously interrupted. It is also possible for the authenticated user to select and view a piece of content viewed by his or her related user from the second list even if the authenticated user has never viewed that piece of content. Further, if the related user creates the viewing history information VH by interrupting the content viewing in a state appropriate to a segment of the content worthy of attention (e.g., specific scene in video content or specific page in electronic book content), the authenticated user can initiate the content viewing from that interruption state. This allows the users to readily share not only a content viewing history but also information about a specific scene or page in content. In order to promote such sharing of information, each user may be able to add a comment to the viewing history information VH generated as a result of his or her viewing the content. This comment appears in the list displayed by the viewing history display control section 43 together with other information. This allows the authenticated user to select a desired piece of content from the viewing history of a related user while at the same time referring to comments added by the related user.

It should be noted that if the users Ua and Ub are engaged in joint viewing, two pieces of the viewing history information VH, each including identification information of each user as the authenticated user identification information AUID, may be generated and recorded to the viewing history management server 20. In this case, in order to ensure that the same content viewing histories are not redundantly displayed in the second list, the viewing history display control section 43 may extract, of the viewing history information VH of the related user, the viewing history information VH including the user identification information of the authenticated user in the joint viewing user information VU as the joint viewing user identification information VUID, and may exclude this viewing history information VH from information to be displayed in a list.

Figure 7:
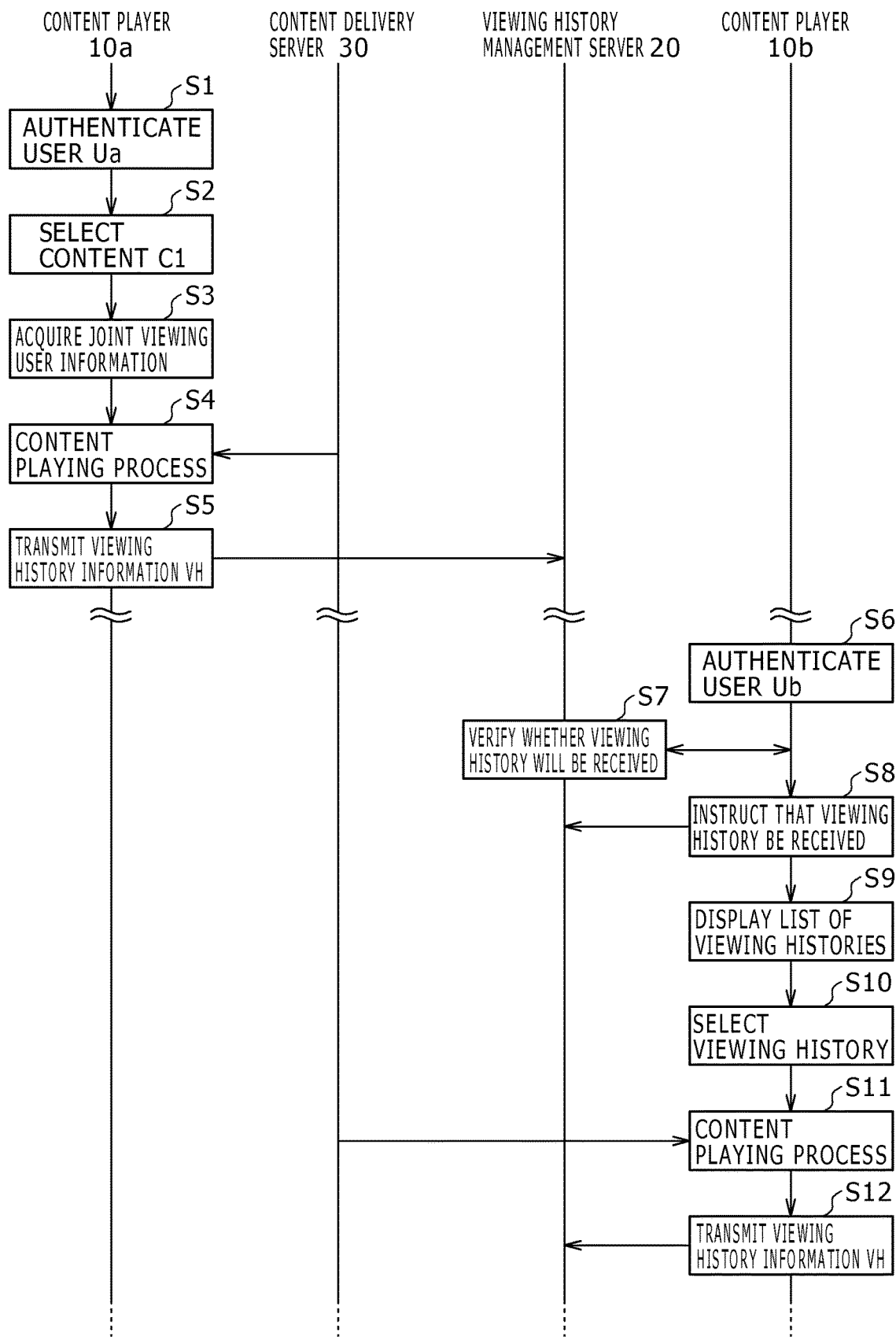
FIG. 7 is a flowchart illustrating an example of a process performed by the content viewing management system according to the embodiment of the present invention.

A description will be given here of a specific example of a process performed by each player when users practically share a viewing history using the content viewing management system 1 according to the present embodiment with reference to the flowchart shown in FIG. 7. Here, it is assumed that the user Ua owns the content player 10a, that the user Ub owns a content player 10b, and that the user Ua has been specified as a related user of the user Ub.

In this example, the user Ua is authenticated by the user authentication section 40 of the content player 10a first and becomes an authenticated user (S1), after which he or she issues an instruction to select a piece of content to be played (content C1 here) (S2). Here, the content playing process section 41 of the content player 10a acquires information of the joint viewing user who will view the content with the authenticated user ahead of starting to play the content (S3). As an example, the content playing process section 41 inquires the authenticated user Ua with whom he or she will view the content C1 from now by displaying a list of related users of the authenticated user Ua on the display section 15. FIG. 8 shows a display example of an inquiry screen about such joint viewing users. Here, it is assumed that the user Ua views the content C1 together with the user Ub at home. On the screen shown in FIG. 8, the user Ua selects the user Ub as a joint viewing user.

Then, the content playing process section 41 of the content player 10*a* requests the content delivery server 30 to deliver the content C1 selected in S2, performing the playing process of the delivered content (S4). If the content playing process is terminated in response to an instruction from the user Ua halfway through the playing of the content C1, the content playing process section 41 outputs the interruption state information RI indicating the interruption state at that time to the viewing history transmission section 42 as described earlier. In response thereto, the viewing history transmission section 42 generates the viewing history information VH about the content playing process performed in S4, transmitting the information VH to the viewing history management server 20 (S5). Here, the viewing history information VH transmitted in S5 includes the interruption state information RI output from the content playing process section 41 as a result of the process performed in S4. Further, the viewing history information VH includes the user identification information of the user Ub acquired in S3 as the joint viewing user identification information VUID. Still further, the viewing type information VT related to the joint viewing user identification information VUID indicates the offline type joint viewing.

It is supposed that the user Ub then attempts to view alone the continuation of the content he or she viewed together with the user Ua in S4 using the content player 10*b*. At this time, the user authentication section 40 of the content player 10*b* authenticates the user Ub first (S6). It is assumed here that the content player 10*b* performs a registration process of the viewing history information VH that has yet to be registered when the user Ub is authenticated.

This registration process is designed to register the viewing history information VH generated as a result of another user viewing content himself or herself as a joint viewing user as the viewing history information VH of his or her own. More specifically, the content player 10*b* inquires the viewing history management server 20 whether the unregistered viewing history information VH is available that includes the user identification information of the authenticated user as the joint viewing user identification information VUID. In response to this inquiry, the viewing history management server 20 searches for the viewing history information VH that includes the user identification information of the user about whom the inquiry was made (user Ub here) as the joint viewing user identification information VUID and that has yet to be registered. Then, the viewing history management server 20 inquires the content player 10*b* whether it can accept the viewing history information VH extracted as a result of the search (S7). Here, the viewing history information VH transmitted to the viewing history management server 20 from the content player 10*a* in S5 matches the search condition. Therefore, the content player 10*b* is inquired whether it will accept the viewing history information VH. In response to this inquiry, the user Ub issues an instruction as to whether he or she will accept the viewing history information VH (S8). If the user Ub rejects the acceptance thereof, the viewing history management server 20 does not generate the viewing history information VH of the user Ub based on this viewing history information VH. On the other hand, when the acceptance is approved, the viewing history management server 20 generates the viewing history information VH for the user Ub based on the viewing history information VH received in S5. That is, the viewing history management server 20 generates the new viewing history information VH that includes the user identification information of the user Ub as the authenticated user identification information AUID and includes, as the joint viewing user identification information VUID, the user identification information of the user Ua recorded as the authenticated user identification information AUID of the original viewing history information VH in place of the user Ub. In short, the viewing history management server 20 creates, from the original viewing history information VH, the viewing history information VH in which the user identification information of the user Ua and that of the user Ub have been interchanged. As a result, despite the fact that the user Ub has not viewed the content C1 as an authenticated user, it is possible to store, in the viewing history management server 20, the same viewing history information VH as when viewing the content C1 as an authenticated user. That is, it is possible to generate the viewing history information VH as if viewing with his or her own content player 10*b* based on a viewing history for joint viewing using the content player 10 of another user and manage this viewing history information VH together with other viewing history information VH.

Here, it is assumed that the user Ub has issued an instruction to receive the viewing history information VH in the process of S8. Then, the viewing history display control section 43 displays a list of the viewing history information VH in response to the user request (S9). As described earlier, the viewing history information VH including the user identification information of the user Ub as the authenticated user identification information AUID has been generated in S8 for content viewing in S4. Therefore, the viewing history display control section 43 can include the viewing history information VH appropriate to content viewing in S4 as a content viewing history of the user Ub not only in the second list but also in the first list. This makes it possible for the user Ub to issue an instruction to play the content C1 by selecting this viewing history information VH (S10).

In response to the instruction in S10, the content playing process section 41 of the content player 10*b* starts the content playing process of the content C1 (S11). Moreover, the content playing process section 41 starts to play the content from the state appropriate to the interruption state at the time of interruption of the content playing in S4 by referring to the interruption state information RI included in the viewing history information VH selected in S10. This allows the user Ub to readily view the continuation of the content he or she viewed together with the user Ua using the own content player 10*b*. When the content playing process in S11 ends, the viewing history transmission section 42 of the content player 10*b* generates new viewing history information VH including the interruption state information RI indicating the interruption state of the content playing process, transmitting the information VH to the viewing history management server 20 (S12).

It should be noted that, in the description given above, the content player 10 acquires joint viewing user information by accepting an operation input adapted to select a joint viewing user from a list of related users from the authenticated user. However, the content player 10 may identify a joint viewing user by other methods. For example, if a camera is connected to the content player 10 so that a person browsing the display section 15 can be photographed with the camera, the image photographed by the camera may be subjected to facial recognition to identify the individual browsing the display section 15. Here, if information about facial features of related users is stored in advance in the content player 10, the content player 10 can verify who the individual photographed by the camera is. Further, if each user has a mobile terminal capable of transmitting identification information adapted to identify himself or herself, the content player 10 may identify the user close to the player as a joint viewing user based on information received from such a mobile terminal, for example, through wireless communication.

Figure 9:
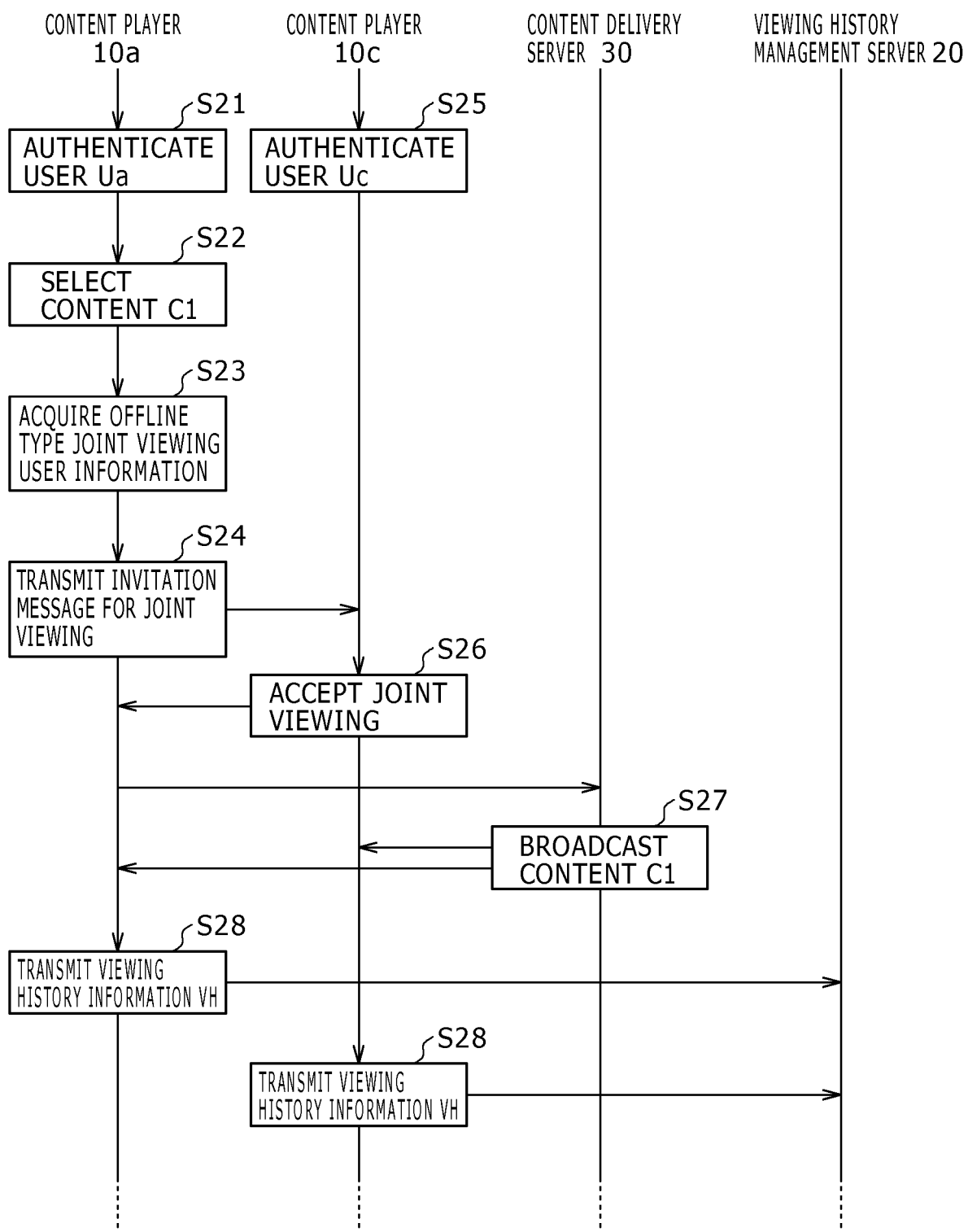
FIG. 9 is a flowchart illustrating another example of a process performed by the content viewing management system according to the embodiment of the present invention.

A description will be given next of a specific example of a process performed by each player when offline type joint viewing and online type joint viewing are carried out in combination with reference to the flowchart shown in FIG. 9. Here, it is assumed that the user Ua owns the content player 10a, that the user Ub owns the content player 10b, that a user Uc owns a content player 10c, and that the users Ua, Ub and Uc have been specified as related users of each other. Further, it is assumed that the users Ua and Ub view the content C1 together using the content player 10a as in the example of the flowchart shown in FIG. 7, and that the user Uc views the content C1 simultaneously using the own content player 10c.

First, the user Ua is authenticated by the user authentication section 40 as in S1 (S21), after which he or she selects the content C1 to be played (S22). Next, the user Ua selects the user Ub as a user to view the content together (S23) and further transmits an invitation message for joint viewing to the user Uc (S24). Here, it is assumed that the user management server 31 manages the login state of each user. That is, when making a reply to the effect that the authentication was successful in response to a request for user authentication from the user authentication section 40 of each of the content players 10, the user management server 31 records state information indicating that the authenticated user is in a logged-in state. Then, when inquired by the other content player 10 whether the related users are in a logged-in state, the user management server 31 answers the inquiry by referring to this state information. This allows each of the content players 10 to acquire information indicating whether the related users of the authenticated user are in a logged-in state. It should be noted that it is assumed that if the authenticated user issues an instruction to terminate the use of each of the content players 10, this content player 10 transmits a message to the user management server 31 to the effect that the logged-in state has been cancelled, and the user management server 31 updates the state information in response thereto. Thanks to the above process, each of the content players 10 knows whether the related users of the authenticated user are in a logged-in state, thus allowing the authenticated user to select a desired user from among the related users in a logged-in state and transmit an invitation message for joint viewing to the selected user. Here, it is assumed that the user Uc is in a logged-in state following a user authentication by the content player 10c ahead of the message transmission in S24 (S25). It should be noted that the invitation message transmitted in S24 may include information notifying that the user Ub is going to view the content together with the user Ua. This allows the user Uc to know that not only the authenticated user Ua of the content player 10a but also the user Ub, a related user thereof, is going to view the content together.

When receiving the invitation message in S24, the content player 10c used by the user Uc inquires the user Uc whether he or she will accept the invitation by displaying the message. If the user Uc returns a message in response thereto to the effect that he or she will accept the invitation, online type joint viewing is established (S26). It should be noted that the exchange of messages between the content players 10 may be carried out via the user management server 31. In this case, when receiving, from the content player 10c, a message to the effect that the invitation has been accepted in response to the invitation message, the user management server 31 transmits, to the content player 10a, a message to the effect that the acceptance has been obtained from the user Uc and instructs the content delivery server 30 to simultaneously broadcast the content C1. It should be noted that the delivery instruction to the content delivery server 30 may be issued from the content player 10a.

When receiving the above delivery instruction, the content delivery server 30 starts real-time delivery of the content C1 to the content players 10a and 10c (S27). This allows the users Ua and Ub to view the content C1 and the user Uc to view it at the same time respectively using the content players 10a and 10c. Further, the users Ua and Uc may be able to exchange chat messages during the content playing process. When the playing process of the content C1 is terminated by an interruption instruction issued by one of the users, each of the content players 10a and 10c generates the viewing history information VH of the content playing, transmitting the information VH to the viewing history management server (S28). Here, the viewing history information VH generated by the content player 10a includes the user identification information of the user Ua as the authenticated user identification information AUID, the user identification information of each of the users Ub and Uc as the joint viewing user information VU, and the viewing type information VT indicating that the user Ub is engaged in offline type joint viewing and that the user Uc is engaged in online type joint viewing. On the other hand, the viewing history information VH generated by the content player 10c includes the user identification information of the user Uc as the authenticated user identification information AUID, the user identification information of each of the users Ua and Ub as the joint viewing user information VU, and the viewing type information VT indicating that both the users Ua and Ub are engaged in online type joint viewing.

Then, each of the users Ua and Uc can view the continuation of the content C1 viewed in S27 using the viewing history information VH recorded in the viewing history management server 20 in S28. Further, the user Ub can generate the viewing history information VH of his or her own including the users Ua and Uc as the joint viewing users and view the continuation of the content C1 using the viewing history information VH by performing the process from S6 onwards in FIG. 6.

The content viewing management system 1 according to the present embodiment described above allows each user to readily select and view a piece of content viewed by his or her friend by acquiring the viewing history information VH of his or her related users, displaying a list of the information VH and selecting the desired viewing history information VH from the list. Further, the viewing history information VH includes the joint viewing user information VU indicating with whom and in which mode joint viewing of content took place. A user who viewed content using, for example, another content player 10 together with a friend rather than using his or her own content player 10 can readily select the content he or she viewed together with the friend and view it using the content player 10 of his or her own by referring to the joint viewing user information VU.

It should be noted that the embodiment of the present invention is not limited to that described above. In the description given above, for example, in order to perform online type joint viewing, simultaneous content viewing begins after a consent is agreed in advance upon between the users who are going to be engaged in the joint viewing. However, the embodiment of the present invention is not limited thereto. For example, a user may notify, during viewing of content, his or her related user in a logged-in state of information about the viewing state of the content, and the related user may show his or her intention to participate in the content viewing to the content delivery server 30 or user management server 31, thereby receiving the real time delivery of the content from the content delivery server 30. Also in this case, the content delivery server 30 or user management server 31 transmits information about the users who participated in joint viewing to each of the content players 10, thus allowing each of the content players 10 to generate the viewing history information VH including user identification information of the related user who participated in joint viewing as the joint viewing user identification information VUID and register the information VH in the viewing history management server 20.

Further, in the about description, each of the content players 10 always performs the authentication process adapted to identify the user who issues an instruction to play content prior to the content playing process. However, if there is always only a single user to use the content player 10, the user authentication by the user authentication section 40 is not necessary. In this case, the content player 10 stores in advance user identification information identifying the user who uses the content player 10 and generates the viewing history information VH including the user identification information as the authenticated user identification information AUID after performing the content playing.

Further, the viewing history information VH may include information indicating the user-definable playing start and end positions rather than the interruption state information RI. This allows each user to provide, to other users who have specified the user as a related user, the viewing history information VH that has been specified by arbitrarily selecting segments the user desires the other users to view.

Still further, in the above description, each of the content players 10 acquires the viewing history information VH of a related user directly related to an authenticated user as a friend. Moreover, each of the content players 10 may acquire the viewing history information VH of a broader spectrum of users such as users who have been specified as related users of a related user (i.e., friends of a friend of the authenticated user) by specifying the broader spectrum of users as related users.

Still further, in the above description, each of the content players 10 acquires the viewing history information VH generated by another content player 10 always via the viewing history management server 20. In some cases, however, each of the content players 10 may acquire the viewing history information VH directly from the other content player 10. More specifically, for example, if instructed by the authenticated user, the content player 10 directly transmits the viewing history information VH to the other content player 10 used by another user who is himself or herself a related user. This allows each of the content players 10 to acquire the viewing history information VH of the other content player 10 and present it to the user even if the viewing history management server 20 is shut down, if communication link cannot be established with the viewing history management server 20, or if the viewing history management server 20 does not exist in the first place.

The invention claimed is:

1. A content player configured to perform a content playing process in response to an instruction by a user, the content player comprising:
    viewing history information acquisition means of acquiring viewing history information about content viewed by a related user with a relation to the user, wherein the related user is using a different content player;
    viewing history information presentation means of presenting, to the user, the viewing history information about recorded video content viewed by the related user acquired by the viewing history information acquisition means; and
    content playing means of performing, if the user selects the viewing history information presented by the viewing history information presentation means, a playing process of the recorded video content indicated by the selected viewing history information,
    wherein the playing process displays a replay of the recorded video content on a display,
    wherein the viewing history information includes information about a joint viewing user who, together with the related user, viewed the recorded video content, and further includes viewing type information indicating either an offline type joint viewing mode or an online type joint viewing mode the joint viewing user viewed the content together with the related user,
        if the mode is an offline type joint viewing mode, the recorded video content was broadcast to the different content player by a content delivery server and the related user submitted information to the different content player to indicate that the joint viewing user was viewing the recorded video content offline with the related user;
        if the mode is an online type joint viewing mode, the recorded video content was simultaneously broadcast to the different content player and a content player of the joint viewing user by a content delivery server after receipt of a joint viewing request from the different content player of the related user to the content player of the joint viewing user;
    wherein the viewing history information presentation means presents, to the user, information included in the viewing history information and indicating the joint viewing user and also presents, to the user, in which mode the joint viewing user viewed the content together with the related user, in accordance with the viewing type information.

2. The content player of claim 1, wherein the viewing history information includes interruption state information indicating a content playing state at the time of interruption if the playing of the recorded video content by the different content player is interrupted, and
    the content playing means starts the playing of the recorded video content from a state determined in accordance with the interruption state information included in the selected viewing history information.

3. A content viewing management system comprising:
    a plurality of content players; and
    a viewing history management server connected to each of the plurality of content players, wherein
    each of the plurality of content players includes
    content playing process means of performing a content playing process of a video content in response to an instruction by a user,
    wherein the content playing process reproduces a previously recorded video on a display of the content player, viewing history information transmission means of transmitting viewing history information indicating the result of the content playing process to the viewing history management server, viewing history information presentation means of receiving the viewing history information from the viewing history management server and presenting this information to the user, and content playing means of performing, if the user selects the viewing history information presented by the viewing history information presentation means, a playing process of the video content indicated by the selected viewing history information, the viewing history management server includes means of recording a plurality of pieces of viewing history information received from the plurality of content players, and means of transmitting, in response to a request from one of the plurality of content players, viewing history information about the video content viewed by a related user with a relation to the user that made the request with a different content player from which viewing history information is requested from, to the one of the plurality of content players that made the request, and the viewing history information presentation means of the one of the plurality of content players that made the request presents the viewing history information about the video content viewed by the related user received from the viewing history management server to the user currently using the one of the plurality of content players that made the request, wherein the viewing history information includes information about a joint viewing user who, together with the related user, viewed the recorded video content, and further includes viewing type information indicating either an offline type joint viewing mode or an online type joint viewing mode the joint viewing user viewed the content together with the related user, if the mode is an offline type joint viewing mode, the recorded video content was broadcast to the different content player by a content delivery server and the related user submitted information to the different content player to indicate that the joint viewing user was viewing the recorded video content offline with the related user;

if the mode is an online type joint viewing mode, the recorded video content was simultaneously broadcast to the different content player and a content player of the joint viewing user by a content delivery server after receipt of a joint viewing request from the different content player of the related user to the content player of the joint viewing user;

wherein the viewing history information presentation means presents, to the user, information included in the viewing history information and indicating the joint viewing user and also presents, to the user, in which mode the joint viewing user viewed the content together with the related user, in accordance with the viewing type information.

4. A control method of a content player configured to perform a video playing process or a video in response to an instruction by a user, the control method comprising:

a viewing history information acquisition step of acquiring viewing history information about the video viewed by a related user with a relation to the user with a different content player;

a viewing history information presentation step of presenting, to the user, the viewing history information about the video viewed by the related user acquired by the viewing history information acquisition step; and a content playing step of performing, if the user selects the viewing history information presented by the viewing history information presentation step, a playing process of displaying the video indicated by the selected viewing history information, wherein the viewing history information includes information about a joint viewing user who, together with the related user, viewed the recorded video content, and further includes viewing type information indicating either an offline type joint viewing mode or an online type joint viewing mode the joint viewing user viewed the content together with the related user, if the mode is an offline type joint viewing mode, the recorded video content was broadcast to the different content player by a content delivery server and the related user submitted information to the different content player to indicate that the joint viewing user was viewing the recorded video content offline with the related user;

if the mode is an online type joint viewing mode, the recorded video content was simultaneously broadcast to the different content player and a content player of the joint viewing user by a content delivery server after receipt of a joint viewing request from the different content player of the related user to the content player of the joint viewing user;

wherein the viewing history information presentation means presents, to the user, information included in the viewing history information and indicating the joint viewing user and also presents, to the user, in which mode the joint viewing user viewed the content together with the related user, in accordance with the viewing type information.

* * * * *